US007041913B2

(12) United States Patent
Barker, Jr. et al.

(10) Patent No.: US 7,041,913 B2
(45) Date of Patent: May 9, 2006

(54) METHOD AND ARRANGEMENT FOR PROVIDING A GAS-TIGHT HOUSING JOINT

(76) Inventors: James W. Barker, Jr., 7821 Neva, Niles, IL (US) 60714; Michael R. Maroney, 10910 S. Washtenaw Ave., Chicago, IL (US) 60655

( * ) Notice: Subject to any disclaimer, the term of this patent is extended or adjusted under 35 U.S.C. 154(b) by 166 days.

(21) Appl. No.: 10/818,842

(22) Filed: Apr. 6, 2004

(65) Prior Publication Data

US 2004/0187433 A1    Sep. 30, 2004

Related U.S. Application Data

(63) Continuation of application No. 10/017,177, filed on Dec. 18, 2001, now Pat. No. 6,767,036.

(60) Provisional application No. 60/257,959, filed on Dec. 26, 2000.

(51) Int. Cl.
*H01B 17/06*    (2006.01)

(52) U.S. Cl. ............... 174/179; 174/15.6; 174/17 GF; 174/142; 174/169; 174/176; 29/887

(58) Field of Classification Search .............. 174/174, 174/15.4, 15.5, 15.6, 17 CT, 17 GF, 17 R, 174/17.05, 18, 74 A, 74 R, 141 R, 142, 169, 174/176, 178, 179, 192, 195, 199; 29/887
See application file for complete search history.

(56) References Cited

U.S. PATENT DOCUMENTS

| 706,194 | A | 5/1902 | McCarthy |
|---|---|---|---|
| 735,611 | A | 1/1903 | Steinberger |
| 1,029,207 | A | 6/1912 | Megahan |
| 1,038,473 | A | 9/1912 | Alsberg |
| 1,116,303 | A | 11/1914 | Locke |
| 1,167,125 | A | 1/1916 | Sloper |
| 1,170,723 | A | 2/1916 | Allerding |
| 1,516,585 | A | 11/1924 | Austin |
| 1,691,330 | A | 11/1928 | Austin |
| 1,717,287 | A | 6/1929 | Warren et al. |
| 1,730,716 | A | 10/1929 | Austin |
| 1,730,327 | A | 12/1929 | Kempton |
| 1,768,948 | A | 7/1930 | Baum |
| 1,865,134 | A | 6/1932 | Plimpton |
| 1,869,397 | A | 8/1932 | Stroup |
| 1,894,292 | A | 1/1933 | Cramer |
| 1,896,740 | A | 2/1933 | Cosseboom |
| 1,942,284 | A | 1/1934 | Halton |
| 1,967,654 | A | 7/1934 | Austin |
| 1,980,476 | A | 11/1934 | Earle |
| 2,017,519 | A | 10/1935 | Waldron |

(Continued)

FOREIGN PATENT DOCUMENTS

CH    659 907 A5    2/1987

(Continued)

OTHER PUBLICATIONS

S&C Fuse Cutouts—Type XS, Oct. 29, 2001, 1 page.

(Continued)

*Primary Examiner*—Dean A. Reichard
*Assistant Examiner*—Adolfo Nino
(74) *Attorney, Agent, or Firm*—Dana Andrew Alden (57) ABSTRACT

A method and arrangement is provided to form a gas-tight joint between an end flange and a tubular rod. The joint is formed via a heat-shrink process to provide an interference fit. The rod is provided with grooves to retain adhesive during the assembly process.

143 Claims, 2 Drawing Sheets

U.S. PATENT DOCUMENTS

| | | |
|---|---|---|
| 2,049,552 A | 8/1936 | Walsh |
| 2,155,848 A | 4/1939 | Taylor |
| 2,174,476 A | 9/1939 | Pittman et al. |
| 2,221,582 A | 11/1940 | Hanna |
| 2,246,193 A | 6/1941 | Smith, Jr. |
| 2,378,109 A | 6/1945 | Schultz |
| 2,386,112 A | 10/1945 | Harkins |
| 2,593,426 A | 4/1952 | Fahnoe |
| 2,606,954 A | 5/1952 | Baker |
| 2,625,498 A | 1/1953 | Koch |
| 2,653,884 A | 9/1953 | Hussey et al. |
| 2,660,644 A | 11/1953 | Murray et al. |
| 2,723,705 A | 11/1955 | Collins |
| 2,732,423 A | 1/1956 | Morrison |
| 2,741,294 A | 4/1956 | Pancherz |
| 2,744,043 A | 5/1956 | Ramberg |
| 2,747,616 A | 5/1956 | De Ganahl |
| 2,776,332 A | 1/1957 | Von Cron |
| 2,789,154 A | 4/1957 | Peterson |
| 2,821,604 A | 1/1958 | Wallace |
| 2,848,133 A | 8/1958 | Ramberg |
| 2,858,992 A | 11/1958 | Wentz |
| 2,883,448 A | 4/1959 | Hermann |
| 2,900,292 A | 8/1959 | Coleman, Jr. |
| 2,905,582 A | 9/1959 | Coleman, Jr. |
| 2,924,643 A | 2/1960 | Barnes |
| 2,961,518 A | 11/1960 | Hermann |
| 2,997,529 A | 8/1961 | Fink |
| 3,043,120 A | 7/1962 | Waldron |
| 3,057,509 A | 10/1962 | Bernd |
| 3,063,891 A | 11/1962 | Boylan et al. |
| 3,066,180 A | 12/1962 | Virsberg |
| 3,068,133 A | 12/1962 | Cilker et al. |
| 3,110,758 A | 11/1963 | Meier |
| 3,111,451 A | 11/1963 | Peters |
| 3,116,386 A | 12/1963 | Sperzel |
| 3,134,164 A | 5/1964 | Hocks |
| 3,134,874 A | 5/1964 | Cameron |
| 3,152,392 A | 10/1964 | Coppack et al. |
| 3,159,709 A | 12/1964 | Austin et al. |
| D201,133 S | 5/1965 | Vose |
| 3,192,622 A | 7/1965 | Bannerman |
| 3,198,878 A | 8/1965 | Kaczerginski |
| 3,218,517 A | 11/1965 | Sankey |
| 3,235,688 A | 2/1966 | Fink et al. |
| 3,249,719 A | 5/1966 | Misare et al. |
| 3,260,796 A | 7/1966 | Hirtzer |
| 3,261,910 A | 7/1966 | Jacquier |
| 3,282,757 A | 11/1966 | Brussee |
| 3,296,366 A | 1/1967 | Bronikowski |
| 3,307,137 A | 2/1967 | Tordoff et al. |
| 3,323,097 A | 5/1967 | Tordoff |
| 3,325,584 A | 6/1967 | Herzig |
| 3,345,483 A | 10/1967 | Leonard et al. |
| 3,358,076 A | 12/1967 | Rebosio |
| 3,363,174 A | 1/1968 | Hudson et al. |
| 3,377,420 A | 4/1968 | Brown et al. |
| 3,387,839 A | 6/1968 | Miller et al. |
| 3,429,758 A | 2/1969 | Young |
| 3,448,343 A | 6/1969 | Kershaw, Jr. |
| 3,449,182 A | 6/1969 | Wiltshire |
| 3,468,740 A | 9/1969 | Kaczerginski |
| 3,470,051 A | 9/1969 | Meyer |
| 3,485,940 A | 12/1969 | Perry et al. |
| 3,506,833 A | 4/1970 | Von Willisen |
| 3,509,267 A | 4/1970 | Jensen |
| 3,512,118 A | 5/1970 | Leonard |
| 3,513,425 A | 5/1970 | Arndt |
| 3,522,366 A | 7/1970 | Lambeth |
| 3,553,978 A | 1/1971 | Williams |
| 3,567,541 A | 3/1971 | Kaczerginski |
| 3,594,676 A | 7/1971 | Misare |
| 3,611,240 A | 10/1971 | Mikulecky |
| 3,648,211 A | 3/1972 | McKeithan |
| 3,666,589 A | 5/1972 | Alderfer |
| 3,686,603 A | 8/1972 | Lockie et al. |
| 3,686,604 A | 8/1972 | Link et al. |
| 3,715,252 A | 2/1973 | Fairbairn |
| 3,735,019 A | 5/1973 | Hess et al. |
| 3,746,424 A | 7/1973 | Hermstein |
| 3,784,235 A | 1/1974 | Kessler et al. |
| 3,794,751 A | 2/1974 | Farmer et al. |
| 3,802,989 A | 4/1974 | Huber et al. |
| 3,808,352 A | 4/1974 | Johnson |
| 3,810,060 A | 5/1974 | Hubbard |
| 3,826,025 A | 7/1974 | Elliott |
| 3,839,593 A | 10/1974 | Meier et al. |
| 3,850,722 A | 11/1974 | Kreft |
| 3,859,704 A | 1/1975 | Nasson |
| 3,868,615 A | 2/1975 | Haubein et al. |
| 3,898,372 A | 8/1975 | Kalb |
| 3,952,848 A | 4/1976 | Walker et al. |
| 3,979,554 A | 9/1976 | Fesik et al. |
| 4,011,537 A | 3/1977 | Jackson, Jr. et al. |
| 4,045,604 A | 8/1977 | Clabburn |
| 4,053,707 A | 10/1977 | Ely et al. |
| 4,198,538 A | 4/1980 | Lusk |
| 4,212,696 A | 7/1980 | Lusk et al. |
| 4,217,466 A | 8/1980 | Kuhl |
| 4,246,696 A | 1/1981 | Bauer et al. |
| 4,267,402 A | 5/1981 | Reighter |
| 4,296,276 A | 10/1981 | Ishihara et al. |
| 4,308,566 A | 12/1981 | Imataki et al. |
| 4,316,204 A | 2/1982 | Inagaki et al. |
| 4,331,833 A | 5/1982 | Pargamin et al. |
| 4,373,113 A | 2/1983 | Winkler et al. |
| 4,380,483 A | 4/1983 | Kliger |
| 4,386,250 A | 5/1983 | Nicoloso |
| 4,390,745 A | 6/1983 | Bottcher et al. |
| 4,392,714 A | 7/1983 | Brüggendieck et al. |
| 4,409,428 A | 10/1983 | Dey et al. |
| 4,414,527 A | 11/1983 | Biller |
| 4,440,975 A | 4/1984 | Kaczerginski |
| 4,490,006 A | 12/1984 | Lidholt |
| 4,491,687 A | 1/1985 | Kaczerginski et al. |
| 4,540,968 A | 9/1985 | Kato et al. |
| 4,546,341 A | 10/1985 | McNaghten et al. |
| 4,609,798 A | 9/1986 | Nicoloso |
| 4,610,033 A | 9/1986 | Fox, Jr. |
| 4,613,727 A | 9/1986 | Salanki et al. |
| 4,653,846 A | 3/1987 | Yamazaki et al. |
| 4,661,184 A | 4/1987 | Kläy |
| 4,710,847 A | 12/1987 | Kortschinski et al. |
| 4,714,800 A | 12/1987 | Atkins et al. |
| 4,717,237 A | 1/1988 | Austin |
| 4,772,090 A | 9/1988 | Atkins et al. |
| 4,774,488 A | 9/1988 | Field |
| 4,802,731 A | 2/1989 | Maschek et al. |
| 4,810,836 A | 3/1989 | Shinoda et al. |
| 4,827,081 A | 5/1989 | Seabourne et al. |
| 4,833,278 A | 5/1989 | Lambeth |
| 4,845,318 A * | 7/1989 | Clabburn et al. ........... 174/178 |
| 4,864,455 A | 9/1989 | Shimomura et al. |
| 4,870,387 A | 9/1989 | Harmon |
| 4,909,428 A | 3/1990 | Mermet-Guyennet |
| 4,919,217 A | 4/1990 | Mima et al. |
| 4,921,322 A | 5/1990 | Seike et al. |
| 4,945,333 A | 7/1990 | Stroud et al. |
| 4,984,860 A | 1/1991 | Seike et al. |
| 5,029,969 A | 7/1991 | Seike et al. |
| 5,116,172 A | 5/1992 | Koster |
| 5,128,648 A | 7/1992 | Brandi |
| 5,136,680 A | 8/1992 | Seike et al. |
| 5,191,311 A | 3/1993 | Webb et al. |

| | | |
|---|---|---|
| 5,220,134 A | 6/1993 | Novel et al. |
| 5,233,132 A | 8/1993 | Soucille |
| 5,300,912 A | 4/1994 | Tiller et al. |
| 5,374,780 A | 12/1994 | Pazdirek |
| 5,389,742 A | 2/1995 | Clabburn et al. |
| 5,406,033 A | 4/1995 | Pazdirek |
| D360,399 S | 7/1995 | Tillery et al. |
| 5,516,117 A | 5/1996 | Rangel |
| 5,534,858 A | 7/1996 | Tinkham |
| 5,540,991 A | 7/1996 | Hayakawa et al. |
| 5,559,488 A | 9/1996 | Hassler et al. |
| 5,563,379 A | 10/1996 | Kunieda et al. |
| 5,594,827 A | 1/1997 | Joulie et al. |
| 5,633,478 A | 5/1997 | Ishino |
| 5,803,553 A | 9/1998 | Wei |
| 5,877,453 A | 3/1999 | Hill |
| 5,885,680 A | 3/1999 | Levillain et al. |
| 5,914,462 A * | 6/1999 | Fujii .................... 174/179 |
| 5,921,591 A | 7/1999 | Argent |
| 5,925,855 A | 7/1999 | Denndorfer |
| 5,945,636 A | 8/1999 | Sakich et al. |
| 5,973,272 A | 10/1999 | Levillain et al. |
| 5,986,216 A | 11/1999 | Krause |
| 6,031,186 A | 2/2000 | Sakich et al. |
| 6,050,612 A | 4/2000 | Wolterman |
| 6,064,010 A * | 5/2000 | Bessede .................. 174/176 |
| 6,065,207 A | 5/2000 | Fuji |
| 6,070,584 A | 6/2000 | Bergstrom |
| 6,116,113 A | 9/2000 | Pazdirek et al. |
| 6,307,157 B1 * | 10/2001 | Fujii et al. ............. 174/176 |
| 6,318,686 B1 | 11/2001 | No |
| 6,593,842 B1 | 7/2003 | Haynam et al. |
| 6,702,975 B1 | 3/2004 | Windmar et al. |
| 6,767,036 B1 | 7/2004 | Barker, Jr. et al. |
| 2002/0079703 A1 | 6/2002 | Barker, Jr. et al |
| 2002/0158745 A1 | 10/2002 | Haynam et al. |

FOREIGN PATENT DOCUMENTS

| | | |
|---|---|---|
| EP | 0 510 397 B1 | 7/1995 |
| EP | 0 709 862 A1 | 5/1996 |
| FR | 2670255 A1 | 6/1992 |

OTHER PUBLICATIONS

MacLean Molded Products, Inc., Quoatation No. 109-470, Aug. 8, 2001, 2 pages.
MacLean Molded Products, Inc., Quoatation No. 109-471, Aug. 8, 2001, 2 pages.
MacLean Molded Products, Inc., Quoatation No. 109-472, Aug. 8, 2001, 2 pages.
Cutout Insulators Capacity and Scheduling Estimates for 2002, Victor Almgren, Jun. 12, 2002, 1 page.
Thomas G. Gustavsson, Silicone Rubber Insulators-Impacts of material formulation in coastal environment, Apr. 2002, pp. 1-83, Göteborg, Sweden.
Instrument Transformers,Dec. 2000, pp. 1-12, ABB Switchgear AB.
Outdoor Instrument Transformers Buyer's Guide, Feb. 2003, pp. 1-60, ABB Power Technologies.
Silicone rubber in outdoor insulators, Sep. 1998, pp. 1-4, ABB Switchgear AB.
New ABB Factory Signals Long-Term Commitment to Hollow Composite Insulators, Insulator News and Market Reports, May/Jun. 1998, pp. 1-7.
Axicom® More than just a replacement for porcelain, undated, pp. 1-4, Axicom AG.
Composite Hollow Insulators Design Book, undated, pp. 1-7, Axicom.
Cevolit® components. Less weight. Greater Dependability, undated, pp. 1-4, Axicom AG.
Document entitled, "Composite Insulators," p. 1-8, www.trenchgroup.com.
Document entitled, "INMR Quarterly Review," pp. 1-8, Issue 68, Quarter 2, 2005, vol. 13, No. 2.
Document entitled, "INMR Quarterly Review," pp. 1-12, Jan./Feb. 2000, vol. 8, No. 1, www.inmr.com.
Document entitled, "Transform Bushing ANSI Standard," pp. 1-12, www.trenchgroup.com.
Document entitled, "Gas-Insulated Instrument Transformers for outdoor Installation," pp. 1-12, www.trenchgroup.com.
Willie B. Freeman, Tor Orbeck, and Eric Moal "Development of Conical Silicone Rubber Bushings to Replace Porcelain on SF6 Circuit Breakers," pp. 1-7.
Document entitled, "Point de Situation sur les Essais des isolateurs Composites Sediver," pp. 1-2, Sep. 17, 1991.
Picture, p. 1.
Letter to Sediver from GEC ALSTHOM, p. 1, Nov. 13, 1992.
Letter to Sediver from GEC ALSTHOM, p. 1, Oct. 28, 1992.
Invoice No. 675763, GEC ALSTHOM, dated Jul. 12, 1990, p. 1.
Letter to Sediver from ALSTHOM with enclosures, dated Jun. 20, 1989, pp. 1-11.
Drawing, p. 1.
Letter from Sediver to ALSTHOM, dated Jul. 1, 1991 pp. 1-2.
Sediver facsimile dated Sep. 12, 1991, p. 1.
Fact Book CEVOSIL, pp. 1-2.
Claude de Tourreil and Richard Martin, Document entitled, "Évaluation Technologique D'Isolateurs Composites Pour Appareillage," Jan. 1993, pp. 1-31.
J.-L. Bessede, Document entitled, Research & Recent Experience with the Newest Generation of Insulators for Use in Alstom Switchgear: Benefits & Applications, pp. 1-6.
Document entitled, "New Breaker Technology Used in Florida," pp. 1.
Picture entitled, "Cellpack's Cevosil Composite Insulator," p. 1.
W.B. Freeman and K. Froenhch, document entitled, "Application of RTV. Composite Insulation to High Voltage Bushings," pp. 1-2.
Document entitled, "Test Activity Summary," dated Nov. 11, 1989-Dec. 12, 1989, pp. 1-39, Westinghouse Electric Corporation.
Document entitiled, "Technical Data Sheet of the Tub," dated Jul. 1989, CELLPACK, pp. 1-6.
H. Büchner, P. Mohaup, and R. Röder, document entitled, "Modern Trends in Using Silicone Housings for Various Application," dated Nov. 14-17, 1999, pp. 1-8.
W.B. Freeman and K. Froenhch, document entitled, "Application of RTV.Compoiste Insulation to High Voltage Bushings" pp. 1-8.
Document entitled, "Cevosil Composite Insulator Made by Cellpack," dated Feb. 1993, pp. 1-9.
Document entitled, "Cellpack Ltd," pp. 1-15.

* cited by examiner

METHOD AND ARRANGEMENT FOR PROVIDING A GAS-TIGHT HOUSING JOINT

This is a continuation of application Ser. No. 10/017,177, filed Dec. 18, 2001, now U.S. Pat. No. 6,767,036, the disclosure of which is hereby incorporated herein by reference, which claims the benefit of U.S. Provisional Application No. 60/257,959, filed on Dec. 26, 2000 in the names of James W. Barker, Jr. and Michael R. Matoney. Accordingly, this application claims the benefit of U.S. Provisional Application No. 60/257,959, filed on Dec. 26, 2000.

BACKGROUND OF THE INVENTION

1. Field of the Invention

The present invention relates generally to the field of gas-tight columns for protective devices and systems for electrical power transmission and distribution systems, and more particularly to a method and arrangement for providing a gastight joint between two insulating column portions, e.g. between an end flange and a tubular pole-unit rod, for a circuit interrupter.

2. Description of the Related Art

Various methods are know for providing a gas-tight joint between a flange/end fitting and a tubular rod, e.g. especially for arrangements involving the end closures of gas-tight enclosures. One method utilizes a heat-shrink process whereby a metallic end flange is heated and assembled onto a tubular rod to which adhesive has been applied. Another method utilizes a flange having internal grooves that is assembled onto a tubular rod.

While the prior art arrangements may be useful to provide joints, these prior arrangements do not provide a desirable interference fit and the advantage of a grooved assembly.

SUMMARY OF THE INVENTION

Accordingly, it is a principal object of the present invention to provide a gas-tight joint between a rod and an end flange.

These and other objects of the present invention are efficiently achieved by the provision of a method and arrangement for providing a gas-tight joint between two insulating column portions, e.g. between an end flange and a tubular pole-unit rod, for a circuit interrupter. The joint is formed via a heat-shrink process to provide an interference fit.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
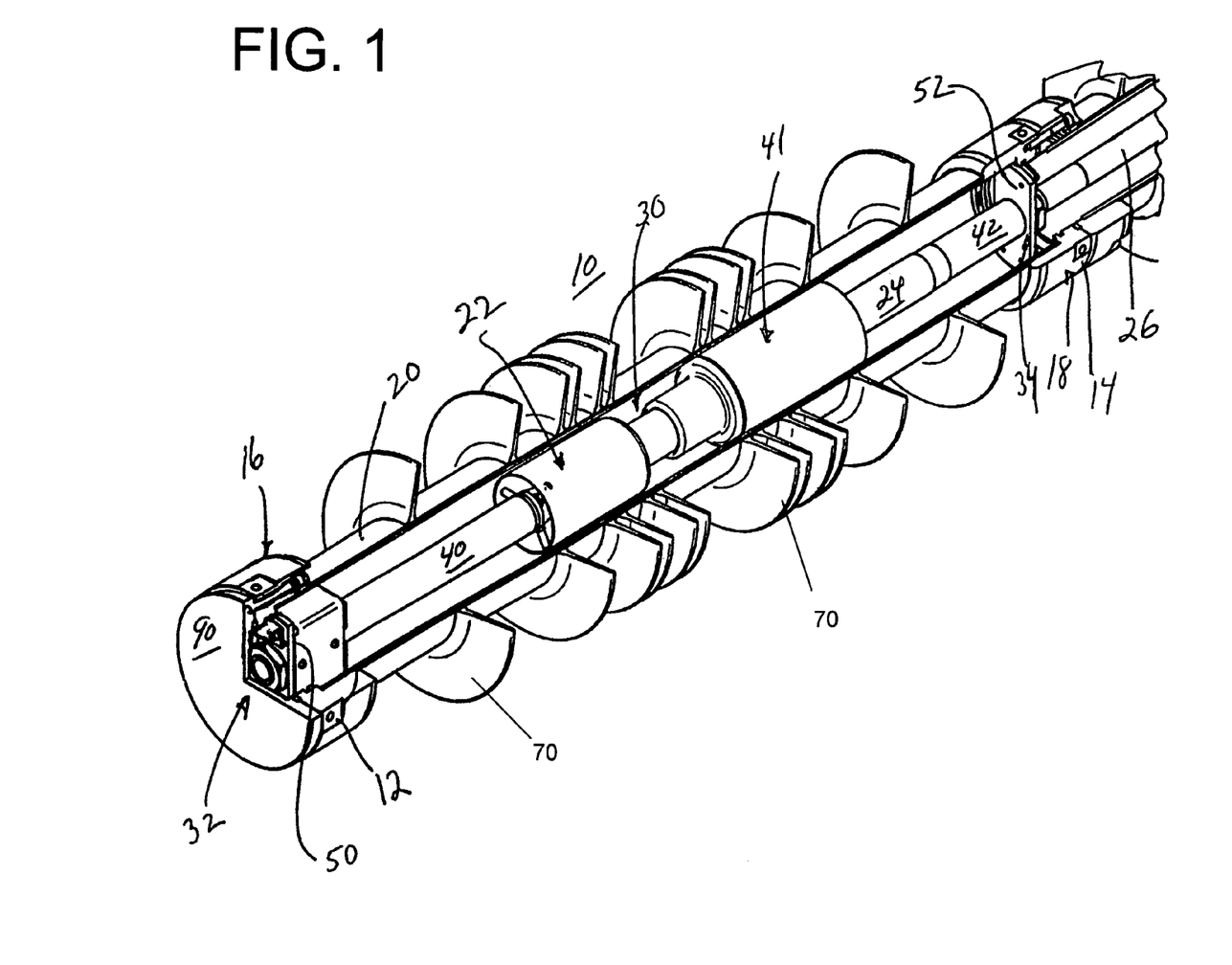
FIG. 1 is a perspective view of an insulating column with parts cut away for clarity that utilizes the joint method and arrangement of the present invention.
Figure 2:
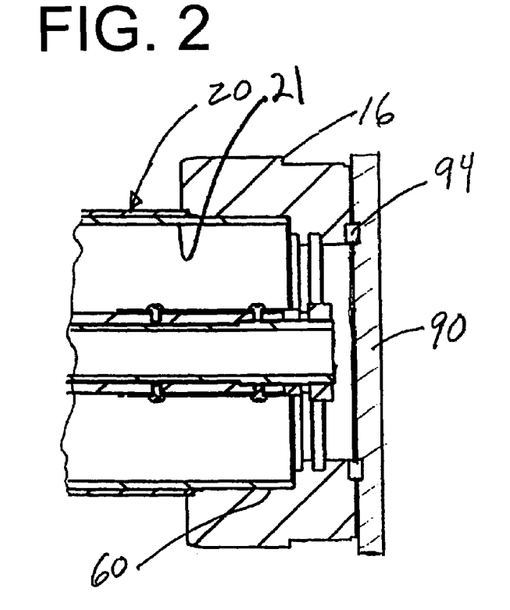
FIG. 2 is a partial sectional view of the insulating column of FIG. 1.

Referring now to an illustrative application of the present invention as shown in FIGS. 1 and 2, an insulating column 10 that includes a circuit interrupter which provides electrical connection to power system circuit terminals at connection points 12, 14, at the top and bottom respectively of the circuit interrupter. In an illustrative embodiment, the insulating column includes at least one weather shed 70. As shown, the insulating column 10 includes a rod 20 that provides a sealed environment containing a gas, e.g. an insulating gas such as $SF_6$. This is advantageous in implementations where the insulating column 10 contains a pressured gas such as $SF_6$. The connection points 12, 14 are provided on respective end flanges 16, 18 carried by the rod 20 of the insulating column 10. The end flanges 16, 18 are affixed to the rod 20 during fabrication thereof to provide gas-tight joints as will be explained in more detail hereinafter.

The circuit interrupter includes upper and lower current carrying contact structures 22, 24 respectively that are relatively movable to open and close the circuit interrupter and thus make and break the electrical connection between the connection points 12, 14. In the illustrative circuit interrupter of FIG. 1, the lower contact structure 24 is movable via an operating member 26 so as to define an open gap at 30 when the circuit interrupter is open. Specifically, the lower contact structure 24 includes a movable contact member 41 that is movable via the operating member 26 and a fixed contact member 42 that supports and transfers current at 43 to the movable contact member 41 that moves within the fixed contact member 42. For example, a flexible contact arrangement is provided at 43 between the contact members 41, 42. At the upper end of the circuit interrupter, an end plate 90 is secured to the upper end flange 16 along with an appropriate scaling element 94 (FIG. 2).

Figure 3:
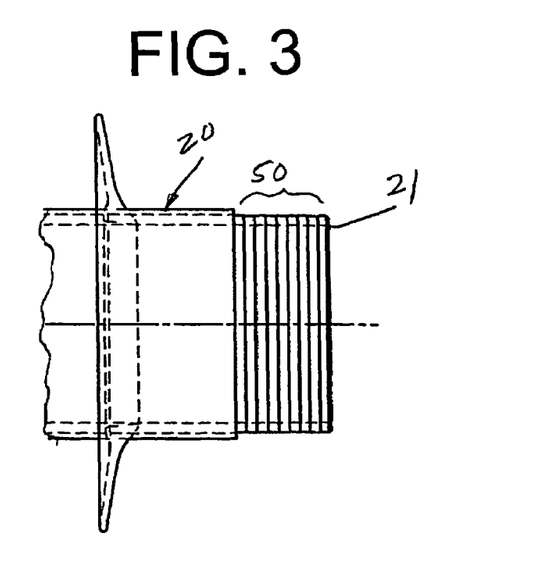
FIG. 3 is an elevational view of a portion of the rod of the insulating column of FIGS. 1 and 2.
Figure 4:
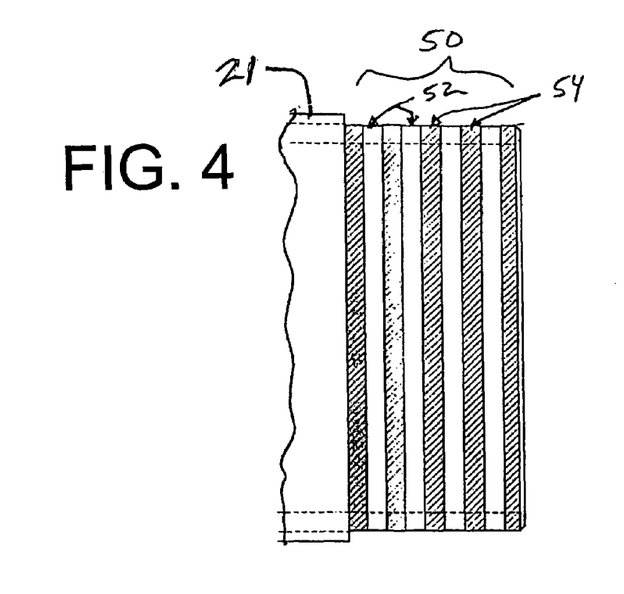
FIG. 4 is an enlarged partial view of the rod of FIG. 3.

Considering now important aspects of the present invention, a gas-tight joint is provided between the rod 20 and the end flanges 16 and 18. In a preferred embodiment, the assembly is accomplished via a heat-shrink process whereby the end flanges 16, 18 are heated and assembled onto the tubular rod 20 to which adhesive has been applied. Referring now additionally to FIGS. 3–4, the tubular rod 20 at each end includes a pattern 50 of grooves 52, e.g. five grooves 52 in an illustrative specific embodiment. "As used herein, the term "end" is intended broadly to encompass the extreme end as well as portions of the rod 20 adjacent to the extreme end." The outer diameter of the tubular rod 20 is reduced, preferably by removing material from the external circumference of the rod 20. The grooves 52 are formed or machined so as to define reduced outer diameter bands or regions on the external circumference of the rod 20, e.g. grooves 52 alternating between the larger outer diameter portions 54 of the rod 20, the portions 54 also may be characterized as bands or regions 54. Additionally, the outer diameter of the rod 20 is reduced by added compressive forces without damage to the rod 20. During assembly, adhesive is applied over the pattern 50. The inner diameter 60 (FIG. 2) of the end flanges 16, 18 is dimensioned at normal temperatures to be a predetermined dimension less than the outer diameter of the tubular rod 20 at the regions or bands 54, e.g. 0.010 of an inch for a tubular rod 20 of approximately 5 inches outer diameter. Thus, an interference fit is established between the portions 54 and the end flanges 16, 18, the end flanges 16, 18 being heated to afford clearance between the rod 20 and the flange for assembly, e.g. heating to a temperature in the range of 150–200 degrees Centigrade, e.g. for end flanges 16, 18 fabricated from aluminum and a rod 20 fabricated from fiberglass. This results in an appropriate interference fit when the parts are cooled e.g. a gas-tight joint over a temperature range of −40C. to +85C. with a gas pressure of 75 psi. In a specific implementation, the grooves 52 are approximately 0.005 of an inch deep and the bands or regions defined thereby are approximately 0.250 of an inch wide. These dimensions have been found to provide a suitable gas-tight joint using epoxy adhesive in the grooves 52, i.e. the grooves 52 retain sufficient adhesive during and after assembly.

The relative dimensions including the depth of the grooves 52 are chosen to ensure that a desirable and appropriate amount of adhesive is retained therein during the heat-shrink assembly process and even if some wiping action occurs at the high points at 54. These dimensions have also been found suitable to avoid excessive adhesive that might result from grooves 52 of excessive depth that might result in any significant degradation of the joint between the end flanges 16, 18 and the tubular rod 20 during thermal extremes. Thus, the grooves 52 maintain the appropriate amount of adhesive to ensure a gas-tight joint and the intermediate portions 54 provide a desirable mechanical shrink fit over a desired range of temperatures, i.e. in a specific example, the gas-tight interference joint is maintained at 85C. and no damage is done to the rod 20 as a result of the added compressive forces at −40C. Additionally, the gas-tight joint is maintained when the rod 20 is loaded with a resultant moment at the joint of 20–30,000 in-lb.

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

The invention claimed is:

1. A method for making an insulating column comprising the steps of:
   a) providing a rod that includes a fiber and an end;
   b) providing a flange that includes an inner diameter;
   c) machining the end of the rod;
   d) assembling the flange onto the rod; and
   e) reducing the inner diameter of the flange.

2. The method according to claim 1 further comprising the step of machining the end of the rod to provide a plurality of grooves.

3. The method according to claim 1 further comprising the step of applying an epoxy adhesive.

4. The method according to claim 1 further comprising the steps of:
   a) providing the rod, wherein the end of the rod includes an outer diameter;
   b) providing the flange wherein the inner diameter of the flange is, at least before assembly onto the rod, smaller than the outer diameter of the end of the rod; and
   c) heating the flange so that the inner diameter of the flange expands.

5. The method according to claim 4 further comprising the step of heating the flange so that the inner diameter of the flange becomes greater than the outer diameter of the end of the rod.

6. The method according to claim 1 further comprising the steps of:
   a) providing the rod, wherein the end of the rod includes an outer diameter; and
   b) providing the flange, wherein the inner diameter of the flange measures between 0.000 of an inch and 0.010 of an inch less than the outer diameter of the end of the rod.

7. The method according to claim 1 wherein the fiber is a glass.

8. The method according to claim 1 further comprising the steps of:
   a) providing the rod, wherein the end of the rod includes an outer diameter; and
   b) heating the flange to expand the diameter so that the inner diameter measures between 0.000 of an inch and 0.010 of an inch less than the outer diameter of the end of the rod.

9. The method according to claim 1 further comprising the steps of:
   a) applying an adhesive; and
   b) assembling the flange onto the rod and thereby wiping at least a portion of the adhesive on the rod.

10. A method for making an insulating column comprising the steps of:
    a) providing a rod that includes a fiber;
    b) machining the rod;
    c) providing a flange;
    d) heating the flange;
    e) assembling the flange onto the rod; and
    f) allowing the flange to cool.

11. The method according to claim 10 further comprising the step of dimensioning an inner diameter of the flange for heating and assembling onto the rod.

12. The method according to claim 10 further comprising the step of expanding a diameter of the flange.

13. The method according to claim 10 further comprising the step of applying an adhesive.

14. The method according to claim 10 further comprising the step of applying an epoxy adhesive.

15. The method according to claim 10 further comprising the steps of:
    a) providing the insulating column with a groove; and
    b) apply an adhesive so that the adhesive is located within the groove.

16. The method according to claim 10 further comprising the step of providing the insulating column with a plurality of grooves.

17. The method according to claim 10 further comprising the step of providing the insulating column with a groove that is machined to provide a reduced diameter capable of receiving an adhesive.

18. The method according to claim 10 further comprising the step of providing the insulating column with a groove that is formed to provide a reduced diameter capable of receiving an adhesive.

19. The method according to claim 10 further comprising the step of providing the insulating column with a plurality of grooves having a reduced diameter and located between a plurality of alternating larger diameter portions.

20. The method according to claim 10 further comprising the step of containing an insulating gas within the rod.

21. The method according to claim 10 wherein the fiber is a glass.

22. The method according to claim 10 further comprising the step of creating a gas-tight seal between the rod and the flange.

23. The method according to claim 10 further comprising the steps of:
    a) providing the rod with an end that has an outer diameter;

b) providing the flange with an inner diameter that, at least before assembly onto the rod, is smaller than the outer diameter of the end of the rod;

c) machining the end of the rod to receive the flange; and d) heating the flange so that the inner diameter of the flange expands.

24. The method according to claim 23 further comprising the step of heating the flange so that the inner diameter of the flange becomes greater than the outer diameter of the end of the rod.

25. The method according to claim 10 further comprising the step of containing an insulating gas that includes $SF_6$ within the rod.

26. The method according to claim 10 wherein the flange is provided with an inner diameter that measures between 0.000 of an inch and 0.010 of an inch less than an outer diameter of an end of the rod.

27. The method according to claim 10 further comprising the steps of:

a) providing the flange with an inner diameter; and b) heating the flange to expand the inner diameter so that the inner diameter measures between 0.000 of an inch and 0.010 of an inch less than an outer diameter of the rod.

28. The method according to claim 10 further comprising the steps of:

a) heating the flange; and b) providing an interference fit between the rod and the flange.

29. The method according to claim 10 further comprising the step of heating the flange to a temperature in the range of 150–200 degrees Centigrade.

30. The method according to claim 10 wherein the flange includes aluminum.

31. The method according to claim 10 further comprising the step of providing the insulating column with a plurality of grooves that are dimensioned to retain an adhesive during assembly.

32. The method according to claim 10 further comprising the step of providing the insulating column with a plurality of grooves that are dimensioned to retain an adhesive after assembly.

33. The method according to claim 10 further comprising the steps of:

a) applying an adhesive; and b) assembling the flange onto the rod and thereby wiping at least a portion of the adhesive on the rod.

34. A method for making an insulating column comprising the steps of:

a) providing a rod that includes a fiber and an end that has an outer diameter;

b) machining the end of the rod;

c) providing a flange that includes an inner diameter;

d) heating the flange;

e) assembling the flange onto the end of the rod;

) allowing the flange to cool;

g) providing at least one shed; and h) locating the shed around at least a portion of the rod.

35. The method according to claim 34 further comprising the step of dimensioning the inner diameter of the flange for heating and assembling onto the rod.

36. The method according to claim 34 further comprising the step of expanding the inner diameter of the flange.

37. The method according to claim 34 further comprising the step of applying an adhesive.

38. The method according to claim 34 further comprising the step of applying an epoxy adhesive.

39. The method according to claim 34 further comprising the steps of:

a) providing the insulating column with a groove; and b) applying an adhesive so that the adhesive is located within the groove.

40. The method according to claim 34 further comprising the step of providing the insulating column with a plurality of grooves.

41. The method according to claim 34 further comprising the step of providing the insulating column with a groove that is capable of receiving an adhesive.

42. The method according to claim 34 further comprising the step of providing the insulating column with a groove that is formed to provide a reduced diameter capable of receiving an adhesive.

43. The method according to claim 34 further comprising the step of providing the insulating column with a plurality of grooves so that a reduced diameter portion is located between a plurality of alternating larger diameter portions.

44. The method according to claim 34 further comprising the steps of:

a) heating the flange so that the inner diameter of the flange expands;

b) applying an adhesive so that after assembly, the adhesive is located between at least a portion of the flange and at least a portion of the rod; and c) allowing the flange to cool.

45. The method according to claim 34 wherein the fiber is a glass.

46. The method according to claim 34 further comprising the step of creating a gas-tight seal between the rod and the flange.

47. The method according to claim 34 further comprising the steps of:

a) providing the flange, wherein the inner diameter of the flange is, at least before assembly onto the rod, smaller than the outer diameter of the end of the rod; and b) heating the flange so that the inner diameter of the flange expands.

48. The method according to claim 47 further comprising the step of heating the flange so that the inner diameter becomes greater than the outer diameter of the end.

49. The method according to claim 34 wherein the flange is provided with an inner diameter that measures between 0.000 of an inch and 0.010 of an inch less than the outer diameter of an end of the rod.

50. The method according to claim 34 further comprising the step of heating the flange to expand the inner diameter so that the inner diameter measures between 0.000 of an inch and 0.010 of an inch less than the outer diameter of the rod.

51. The method according to claim 34 further comprising the steps of:

a) heating the flange; and b) providing an interference fit between the rod and the flange.

52. The method according to claim 34 further comprising the step of heating the flange to a temperature in the range of 150–200 degrees Centigrade.

53. The method according to claim 34 wherein the flange includes aluminum.

54. The method according to claim 34 further comprising the step of providing the insulating column with a plurality of grooves that are dimensioned to retain an adhesive during assembly.

55. The method according to claim 34 further comprising the steps of:
a) applying an adhesive; and
b) assembling the flange onto the rod and thereby wiping at least a portion of the adhesive on the rod.

56. The method according to claim 34 further comprising the step of providing the insulating column with a plurality of grooves that are dimensioned to retain an adhesive during a heat shrink process.

57. A method for making an insulating column comprising the steps of:
a) providing a rod that includes a fiber and an end that includes an outer diameter;
b) providing a flange that includes an inner diameter that has been dimensioned to be smaller than the outer diameter of the rod
c) heating the flange;
d) applying an adhesive;
e) assembling the flange onto the rod and thereby wiping at least a portion of the adhesive on the rod; and
f) allowing the flange to cool.

58. The method according to claim 57 further comprising the step of dimensioning the inner diameter of the flange for heating and assembling onto the rod.

59. The method according to claim 57 further comprising the step of expanding the inner diameter of the flange.

60. The method according to claim 57 further comprising the step of applying an adhesive to the end of the rod.

61. The method according to claim 57 further comprising the steps of:
a) providing the insulating column with a groove; and
b) applying an adhesive so that the adhesive is located within the groove.

62. The method according to claim 57 further comprising the step of providing the insulating column with a plurality of grooves.

63. The method according to claim 57 further comprising the step of providing the insulating column with a groove that is machined to provide a reduced diameter capable of receiving an adhesive.

64. The method according to claim 57 further comprising the step of providing the insulating column with a groove that is formed to provide a reduced diameter capable of receiving an adhesive.

65. The method according to claim 57 further comprising the step of providing the insulating column with a plurality of grooves having a reduced diameter and located between a plurality of alternating larger diameter portions.

66. The method according to claim 57 further comprising the step of containing an insulating gas within the rod.

67. The method according to claim 57 further comprising the steps of:
a) applying an adhesive; and
b) assembling the flange onto the rod and thereby wiping at least a portion of the adhesive on the rod.

68. The method according to claim 57 wherein the fiber is a glass.

69. The method according to claim 57 further comprising the step of creating a gas-tight seal between the rod and the flange.

70. The method according to claim 57 further comprising the steps of:
a) machining the end of the rod to receive the flange; and
b) heating the flange so that the inner diameter of the flange expands.

71. The method according to claim 70 further comprising the step of heating the flange so that the inner diameter of the flange becomes greater than the outer diameter of the end of the rod.

72. The method according to claim 57 further comprising the step of sealing an insulating gas within the rod.

73. The method according to claim 57 wherein the flange is provided with an inner diameter that measures between 0.000 of an inch and 0.010 of an inch less than the outer diameter of the rod.

74. The method according to claim 57 further comprising the step of heating the flange to expand the inner diameter so that the inner diameter measures between 0.000 of an inch and 0.010 of an inch less than the outer diameter of the rod.

75. The method according to claim 57 further comprising the step of providing an interference fit between the rod and the flange.

76. The method according to claim 57 further comprising the step of heating the flange to a temperature in the range of 150–200 degrees Centigrade.

77. The method according to claim 57 wherein the flange includes aluminum.

78. The method according to claim 57 further comprising the step of providing the insulating column with a plurality of grooves that are dimensioned to retain an adhesive during assembly.

79. The method according to claim 57 further comprising the step of providing the insulating column with a plurality of grooves that are dimensioned to retain an adhesive after assembly.

80. The method according to clam 57 further comprising the step of providing the insulating column with a plurality of grooves that are dimensioned to retain an adhesive during a heat shrink process.

81. A method for making an insulating column comprising the steps of:
a) providing a rod that includes a fiber and is provided with an outer diameter;
b) providing a flange that includes an inner diameter;
c) dimensioning the inner diameter of the flange so that the inner diameter is smaller than the outer diameter of the rod;
d) heating the flange;
e) expanding the inner diameter of the flange;
f) reducing the outer diameter of the rod;
g) assembling the flange onto the rod; and
h) allowing the flange to cool.

82. The method of claim 81 further comprising the step of reducing the outer diameter of the rod by machining.

83. The method of claim 81 further comprising the step of reducing the outer diameter of the rod by forming.

84. The method of claim 81 further comprising the step of
a) reducing the outer diameter of the rod to provide a reduced outer diameter region on the rod; and
b) applying an adhesive to at least a portion of the reduced outer diameter region.

85. The method of claim 81 further comprising the step of
a) reducing the outer diameter of the rod to provide a reduced outer diameter region on the rod;
b) applying an adhesive to at least a portion of the reduced outer diameter region; and
c) locating at least a portion of the reduced outer diameter region within the flange.

86. The method of claim 81 further comprising the step of including at least one weather shed on the insulating column.

87. The method of claim 81 further comprising the step of applying an adhesive.

88. The method of claim 81 wherein the inner diameter of the flange is expanded through heating.

89. The method of claim 81 further comprising the step of providing the insulating column with a surface that includes a plurality of grooves.

90. The method of claim 81 wherein the fiber is a glass.

91. The method of claim 81 further comprising the steps of:
   a) providing the rod, wherein the rod includes an end that is provided with the outer diameter;
   b) providing the flange, wherein the inner diameter of the flange is, at least before assembly onto the rod, smaller than the outer diameter of the end of the rod;
   c) machining the end of the rod to receive the flange; and
   d) heating the flange so that the inner diameter of the flange expands.

92. The method of claim 81 further comprising the step of heating the flange to a temperature in the range of 150 to 200 degrees centigrade.

93. The method of claim 81 further comprising the step of heating the flange to a temperature in excess of 160 degrees centigrade.

94. The method of claim 81 further comprising the step of dimensioning the inner diameter of the flange to be within 0.010 of inch less than the outer diameter of the rod.

95. The method of claim 81 further comprising the steps of providing a plurality of grooves and dimensioning the grooves to retain an adhesive.

96. The method of claim 81 wherein the outer diameter of the rod is reduced by a compressive force.

97. The method according to claim 96, further comprising the step of providing the insulating column with a plurality of grooves that are dimensioned to retain an adhesive during a heat shrink process.

98. The method of claim 81 wherein the outer diameter is reduced by removing material from the rod.

99. The method of claim 81 further comprising the step of assembling the flange onto the rod using force.

100. The method of claim 81 further comprising the step of containing an insulating gas that includes $SF_6$ within the rod.

101. The method of claim 81 further comprising the step of reducing the outer diameter of at least a portion of the rod by no more than 0.01 of an inch.

102. The method of claim 81 wherein the outer diameter of the rod is reduced by machining at least one groove to a depth of no more than 0.005 of an inch.

103. A method for making an insulating column comprising the steps of:
   a) providing a rod that includes a fiber and is provided with an outer diameter located at an end;
   b) providing a flange that includes an inner diameter;
   c) dimensioning the inner diameter of the flange so that the inner diameter is smaller than the outer diameter of the rod;
   d) heating the flange;
   e) expanding the inner diameter of the flange;
   f) reducing the outer diameter of the rod;
   g) assembling the flange onto the end of the rod; and
   h) allowing the flange to cool.

104. The method of claim 103 further comprising the step of applying an adhesive to at least one of the rod and the flange before assembling the flange onto the end of the rod.

105. The method of claim 103 further comprising the step of reducing the outer diameter of the rod by forming.

106. The method of claim 103 further comprising the step of
   a) reducing the outer diameter of the rod to provide a reduced outer diameter region on the rod; and
   b) applying an adhesive to at least a portion of the reduced outer diameter region.

107. The method of claim 103 further comprising the step of including at least one weather shed on the insulating column.

108. The method of claim 103 further comprising the step of applying an adhesive.

109. The method of claim 103 wherein the inner diameter of the flange is expanded through heating.

110. The method of claim 103 further comprising the step of providing the insulating column with a surface that includes a plurality of grooves.

111. The method of claim 103 wherein the fiber is a glass.

112. The method of claim 103 further comprising the step of heating the flange to a temperature in the range of 150 to 200 degrees centigrade.

113. The method of claim 103 further comprising the step of heating the flange to a temperature in excess of 160 degrees centigrade.

114. The method of claim 103 further comprising the step of dimensioning the inner diameter of the flange to be within 0.010 of inch less than the outer diameter of the rod.

115. The method of claim 103 further comprising the steps of:
   a) providing the flange, wherein the inner diameter of the flange is, at least before assembly onto the rod, smaller than the outer diameter of the end of the rod;
   b) machining the end of the rod to receive the flange; and
   c) heating the flange so that the inner diameter of the flange expands.

116. The method of claim 103 further comprising the steps of providing a plurality of grooves and dimensioning the grooves to retain an adhesive.

117. The method of claim 103 wherein the outer diameter of the rod is reduced by a compressive force.

118. The method of claim 103 wherein the outer diameter is reduced by removing material from the rod.

119. The method of claim 103 further comprising the step of assembling the flange onto the rod using force.

120. The method of claim 103 further comprising the step of reducing the outer diameter of at least a portion of the rod by no more than 0.01 of an inch.

121. The method of claim 103 wherein the outer diameter of the rod is reduced by machining at least one groove to a depth of no more than 0.005 of an inch.

122. A method for making an insulating column comprising the steps of:
   a) providing a rod that includes a fiber and is provided with an outer diameter;
   b) providing a flange that includes an inner diameter;
   c) dimensioning the inner diameter of the flange so that the inner diameter is smaller than the outer diameter of the rod;
   d) heating the flange;
   e) expanding the inner diameter of the flange;
   f) reducing the outer diameter of the rod;
   g) assembling the flange onto the rod;
   h) allowing the flange to cool; and
   i) containing an insulating gas within the rod.

123. The method of claim 122 further comprising the step of reducing the outer diameter of the rod by machining.

124. The method of claim 122 further comprising the step of reducing the outer diameter of the rod by forming.

125. The method of claim 122 further comprising the step of including at least one weather shed on the insulating column.

126. The method of claim 122 further comprising the step of applying an adhesive.

127. The method of claim 122 further comprising the step of expanding the inner diameter of the flange through heating.

128. The method of claim 122 further comprising the step of providing the insulating column with a surface that includes a plurality of grooves.

129. The method of claim 122 wherein the fiber is a glass.

130. The method of claim 122 further comprising the step of heating the flange to a temperature in the range of 150 to 200 degrees centigrade.

131. The method of claim 122 further comprising the step of heating the flange to a temperature in excess of 160 degrees centigrade.

132. The method of claim 122 further comprising the step of dimensioning the inner diameter of the flange to be within 0.010 of inch less than the outer diameter of the rod.

133. The method of claim 122 further comprising the steps of:
  a) providing the rod, wherein the rod includes an end that is provided with the outer diameter;
  b) providing the flange, wherein the inner diameter of the flange is, at least before assembly onto the rod, smaller than the outer diameter of the end of the rod;
  c) machining the end of the rod to receive the flange; and
  d) heating the flange so that the inner diameter of the flange expands.

134. The method of claim 122 further comprising the steps of providing a plurality of grooves and dimensioning the grooves to retain an adhesive.

135. The method of claim 122 wherein the outer diameter of the rod is reduced by a compressive force.

136. The method of claim 122 wherein the outer diameter is reduced by removing material from the rod.

137. The method of claim 122 further comprising the step of assembling the flange onto the rod using force.

138. The method of claim 122 further comprising the step of containing an insulating gas that includes $SF_6$ within the rod.

139. The method of claim 122 further comprising the step of reducing the outer diameter of at least a portion of the rod by no more than 0.01 of an inch.

140. The method of claim 122 wherein the outer diameter of the rod is reduced by machining at least one groove to a depth of no more than 0.005 of an inch.

141. The method of claim 122 further comprising the step of
  a) reducing the outer diameter of the rod to provide a reduced outer diameter region on the rod; and
  b) applying an adhesive to at least a portion of the reduced outer diameter region.

142. A method for making an insulating column comprising the steps of:
  a) providing a rod dint includes a fiber and an end that has an outer diameter;
  b) machining the end of the rod;
  c) providing a flange that includes an inner diameter that is before assembly onto the rod, smaller than the outer diameter of the end of the rod;
  d) heating the flange so that the inner diameter expands;
  e) assembling the flange onto the end of the rod; and
  f) providing a shed that is located around the rod.

143. The method of claim 142 further comprising the step of continuing to heat the flange so that the inner diameter of the flange exceeds the outer diameter of the end of the rod.

* * * * *